United States Patent [19]
Pettis et al.

[11] Patent Number: 5,984,143
[45] Date of Patent: Nov. 16, 1999

[54] PORTABLE MULTI-COMPARTMENT CHEMICAL STORAGE AND MIXING TANK

[75] Inventors: Billy R. Pettis, Durham; Randy L. Vaughn, Coats; Richard E. Dombkowski; Brad S. Filson, both of Cary, all of N.C.

[73] Assignee: BASF Corporation, Olive, N.J.

[21] Appl. No.: 08/734,931

[22] Filed: Oct. 22, 1996

[51] Int. Cl.⁶ ................................................. B65D 83/14
[52] U.S. Cl. .................. 222/134; 222/145.5; 222/399; 222/136; 137/607
[58] Field of Search .................. 222/51, 136, 145.5, 222/399, 454.1, 529, 134, 145.6, 145.7; 137/607, 614.2, 614.22; 141/382; 251/148, 449.8

[56] References Cited

U.S. PATENT DOCUMENTS

| | | | |
|---|---|---|---|
| 3,180,350 | 4/1965 | Rill, Jr. et al. | 137/607 X |
| 3,409,044 | 11/1968 | Sobek et al. | 137/607 |
| 3,633,795 | 1/1972 | Brooks | 222/134 |
| 4,137,048 | 1/1979 | Steinman | 137/607 X |
| 4,458,831 | 7/1984 | Holleran et al. | 222/134 |
| 5,082,142 | 1/1992 | Saidman et al. | 222/136 X |
| 5,465,874 | 11/1995 | Roach et al. | 222/145.5 X |
| 5,628,431 | 5/1997 | Roach et al. | 222/145.5 |

Primary Examiner—Kenneth Bomberg
Attorney, Agent, or Firm—Nixon & Vanderhye PC

[57] ABSTRACT

A portable holding and mixing tank is provided with a valving assembly, the activation of which responsively enables substantial simultaneous flow of each dissimilar liquid contained within the respective holding compartments to a manifold assembly. The substantial simultaneous flow of each dissimilar liquid to the manifold assembly thereby minimizes (if not eliminates entirely) the possibility that incorrect mixing ratios of the dissimilar chemicals will occur. The manifold assembly mixes the liquids and discharges the mixed liquid through a meter to a transfer conduit. As such, the mixed liquids may be transferred to a storage tank (for example, a storage tank associated with agricultural spraying equipment).

14 Claims, 7 Drawing Sheets

PORTABLE MULTI-COMPARTMENT CHEMICAL STORAGE AND MIXING TANK

BACKGROUND OF THE INVENTION

Novel self-contained pressurized and portable tank systems are disclosed in U.S. Pat. Nos. 5,465,874 and 5,628,431 whereby dissimilar agricultural chemicals can be stored separately of one another, yet are mixed at a selected ratio in response to transferal of the chemicals to crop applicator equipment. More specifically, such previously proposed tank systems include at least two fluid-isolated holding compartments (e.g., separate tank units or a dividing wall within the tank interior space) for holding a respective one of the dissimilar liquid chemicals.

A manifold assembly associated with such previously proposed tank systems defines respective channels for the liquid chemicals and for pressurizing fluid supplied from a source thereof. The liquid and pressurizing fluid channels are fluid-connected to each of the holding compartments. A pressurizing supply conduit fluid-connects the source of pressurizing fluid to the pressurizing fluid channel, while liquid supply risers respectively fluid-connect the liquid chemicals contained in each of the holding compartments to the liquid channel defined by the manifold assembly. A liquid discharge port fluid-connects the liquid channel defined by the manifold assembly. As a result, the liquid chemicals within each of the holding compartments are forcibly introduced by means of the pressurizing fluid therewithin into the liquid channel defined by the manifold assembly and are mixed with one another within the liquid channel prior to discharge through the discharge port.

SUMMARY OF THE INVENTION

The present invention relates to improvements in the previously proposed portable tank systems disclosed in U.S. Pat. Nos. 5,465,874 and 5,628,431. In this regard, the portable holding and mixing tank of the present invention is provided with a valving assembly, the activation of which responsively enables substantial simultaneous flow of each of the dissimilar liquids contained within the respective holding compartments to the manifold assembly. The substantial simultaneous flow of each dissimilar liquid to the manifold assembly thereby minimizes (if not eliminates entirely) the possibility that incorrect mixing ratios of the dissimilar chemicals will occur.

These and further aspects and advantages of the present invention will become more clear after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
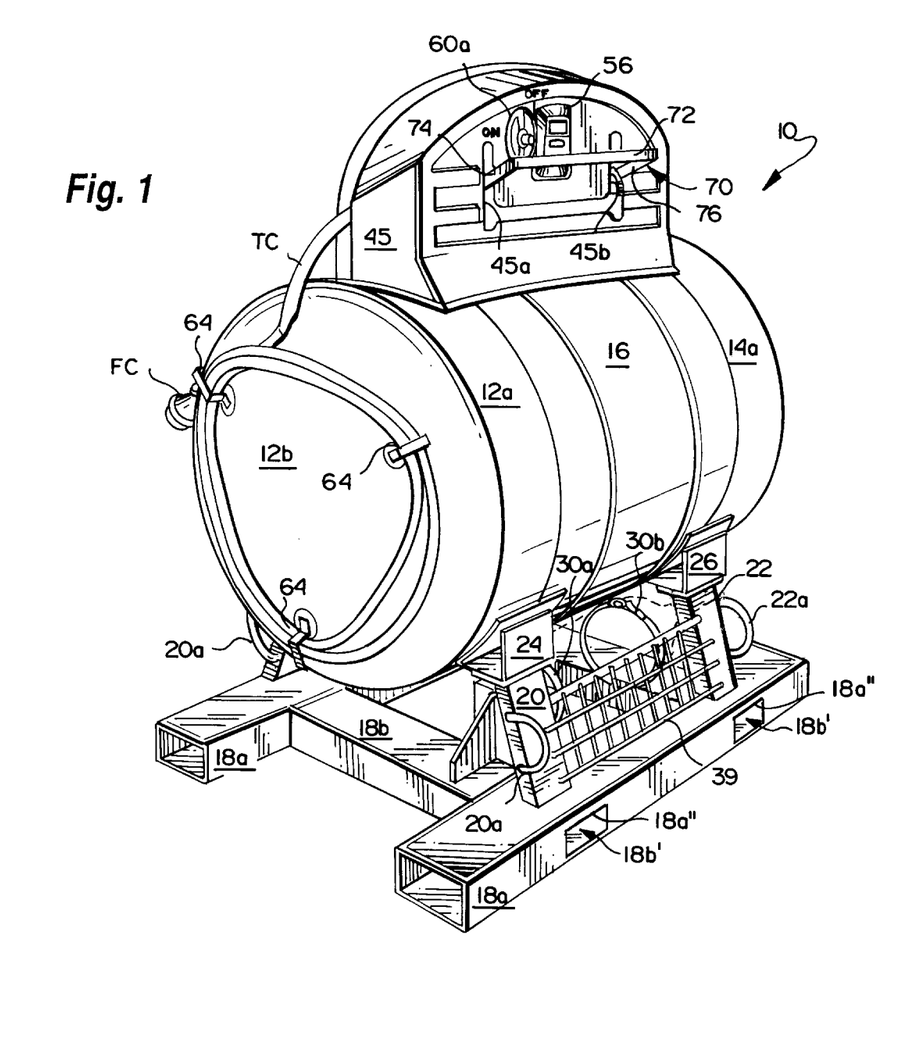
FIG. 1 is a perspective view of the portable multi-compartment chemical storage and mixing tank system according to the present invention.

The multi-compartment tank system 10 in accordance with this invention is shown in accompanying FIG. 1. In this regard, the tank system 10 is especially adapted to be brought physically onto the crop field by any suitable vehicle, such as by a flat bed truck, agricultural tractor or the like. Thus, the tank system 10 is conveniently filled with the desired chemicals by the chemical manufacturer at its manufacturing facility or at a prearranged supply terminal, and thereafter shipped directly to the user. The user then transfers the contents of the tank system 10 to a supply tank associated with crop applicator equipment (e.g., agricultural sprayers) using a flexible transfer conduit TC equipped with a one-way flow coupling FC which is preferably of the type disclosed in the above-cited U.S. patent application Ser. No. 08/426,530 and U.S. Pat. No. 5,465,874. The entire tank system 10 may then be returned by the end user to the manufacture for refilling purposes once the agricultural chemicals contained in the tank system 10 have been emptied into the supply tank associated with the crop applicator equipment.

Figure 2:
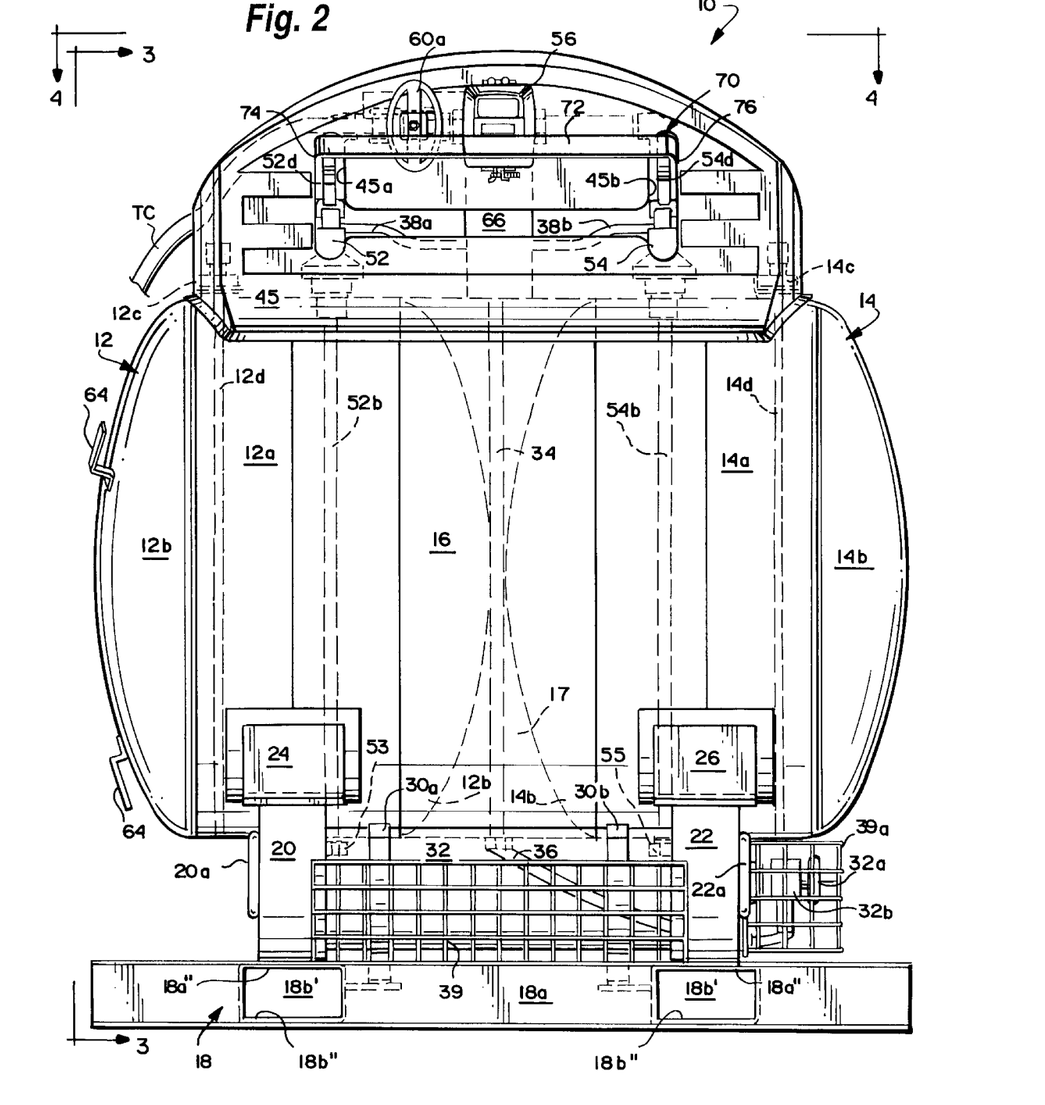
FIG. 2 is a front elevational view of the portable tank system depicted in FIG. 1.
Figure 3:
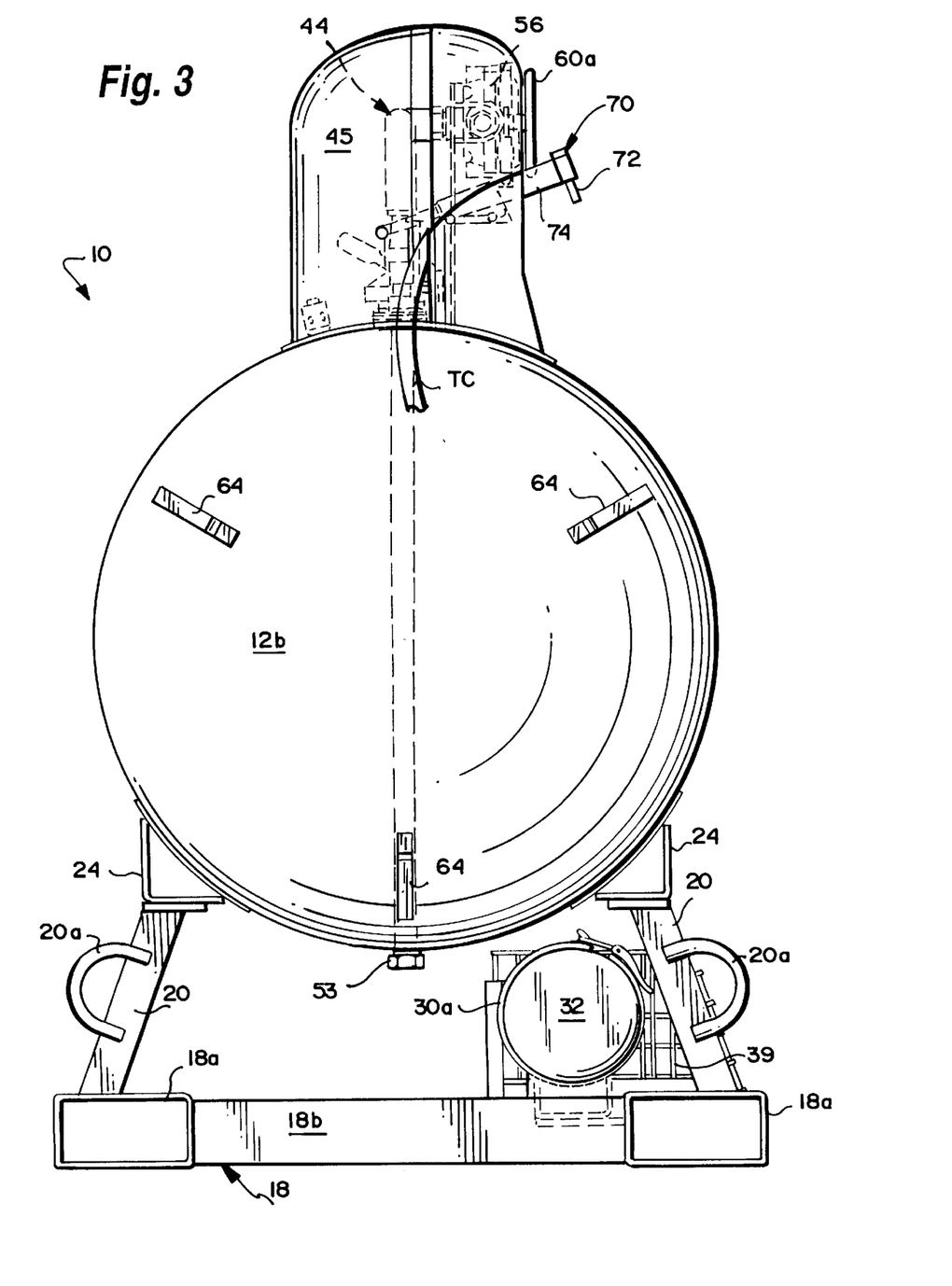
FIG. 3 is a side elevational view of the portable tank system depicted in FIG. 2 as taken along lines 3—3 therein.
Figure 4:
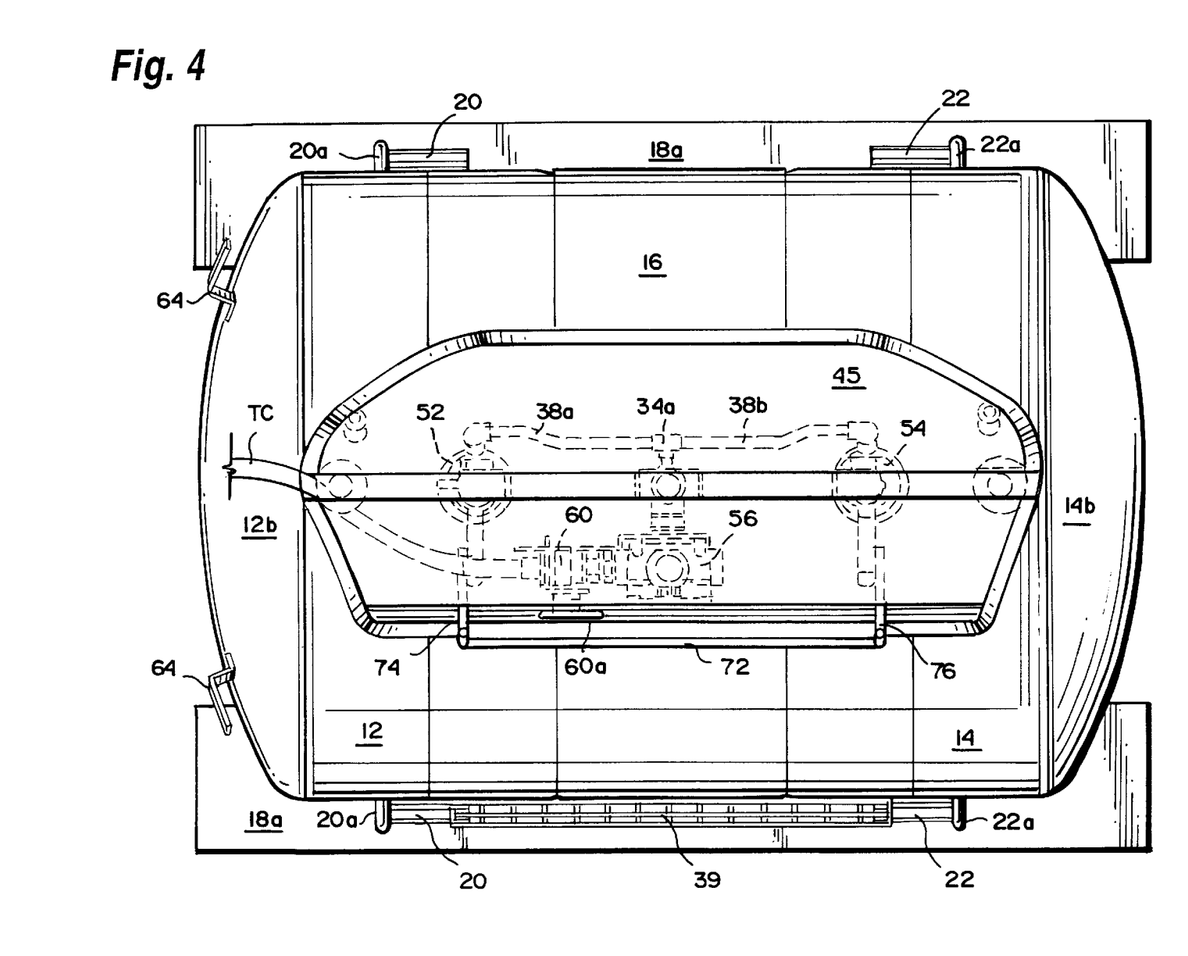
FIG. 4 is a top plan view of the portable tank system depicted in FIG. 2 as taken along lines 4—4 therein.

The multi-compartment tank system 10 according to the present invention is shown in greater detail in accompanying FIGS. 2–4. As shown therein, the tank system 10 is generally comprised of a pair of symmetrically shaped, side-by-side located tank units 12, 14. The tank units 12, 14 are each comprised of a cylindrically shaped central wall panel 12a, 14a and opposed arcuate shaped end panels 12b, 14b rigidly joined to (e.g., by welding) to the central wall panels 12a, 14a, respectively. The tank units 12, 14 are rigidly joined to one another by means of a cylindrical sleeve member 16 so as to circumferentially bound the space 17 established between the opposed end panels 12b, 14b of the tank units 12, 14, respectively. The sleeve member 16 is most preferably welded to the central wall panels 12a, 14a along the entire circumference of its terminal end edges. As a result, the tank system 10 will visually present itself as a generally cylindrically shaped elongate tank having arcuate ends formed by the visible ones of end panels 12b and 14b. Preferably, each of the tank units 12, 14 is provided with respective access ports 12c, 14c which provide a convenient site for liquid level tubes 12d, 14d, respectively, to allow the liquid level in each tank unit 12, 14 to be visually perceived.

The tank units 12, 14 are mounted on a pedestal 18 for purposes of transport and handling. The pedestal 18 preferably includes a pair of elongate width-wise separated tubular runner members 18a which are rigidly joined to one another by a pair of tubular cross-support members 18b (see FIG. 3). The separation distances between the pairs of runner members 18a and the cross-support members 18b are selected so as to accommodate the separated forks associated with conventional fork-lift equipment. In this regard, the tubular members 18a and 18b preferably have a rectangular cross-sectional geometry sized so as to allow the forks associated with such conventional fork-lift equipment to be inserted into their respective rectangular cross-sectional interiors 18a' and 18b' as shown in FIGS. 2 and 3.

The tank units 12, 14 are each supported above the pedestal 18 by upwardly inclined paired leg supports 20, 22 having one end rigidly coupled to a respective runner member 18a, and the other end rigidly coupled to a respective angle member 24, 26. The angle members 24, 26 are, in turn, rigidly coupled via welding to opposite sides of the central wall panels 12a, 14a, respectively. U-shaped tie-down supports 20a, 22a are welded to a respective one of the legs 20, 22 so as to allow the tank system 10 to be securely fastened to a transport vehicle (e.g., a flat bed truck, agricultural tractor or like vehicle).

It will further be observed in FIGS. 2 and 3 that access to the rectangular cross-sectional interiors 18b' of the cross-support member 18b is permitted by correspondingly shaped rectangular cut-outs 18b" being formed in the opposed side walls of the runner members 18a. These cut-outs 18b" therefor each establish a bridge panel 18a" of runner members 18a to which the lower ends of the leg supports 20, 22 are respectively joined. The bridge panels 18a" functionally provide an area of reduced strength which beneficially deforms should the tank system 10 be inadvertently mishandled (e.g., dropped from an extreme height as might occur when loading/unloading the tank system 10 relative to the flat bed truck, agricultural tractor or like vehicle). This deformation of the bridge panels 18a" therefore prevents the tank units 12, 14 from being damaged should such mishandling occur.

The pedestal 18 carries a pair of longitudinally (i.e., relative to the elongate axis of the tank system 10) separated cylinder clamps 30a, 30b which serve to securely and positionally retain a pressurized fluid cylinder 32 containing a pressurizing fluid (e.g., nitrogen or like inert gas) for the contents within the tank units 12, 14. The cylinder 32 is fluid-connected to the lower end of riser conduit 34 via any suitable fluid line 36. The upper end of the riser conduit 34 terminates in a T-coupling 34a from which branch supply conduits 38a, 38b extend (see FIGS. 5 and 6). In this regard, it will be observed in FIG. 2 that the riser conduit 34 extends upwardly in the space 17 established between the adjacent opposed arcuate end panels 12a, 14a which are surrounded by the sleeve member 16. As such, the supply riser 34 is protected and concealed within the tank system 10 by means of the sleeve member 16. Furthermore, the cylinder 32 is itself protected from accidental damage by a cage guard 39 having a hinged end guard 39a. The end guard 39a may thus be moved to an opened position to gain access to and replacement of the cylinder 32.

Figure 6:
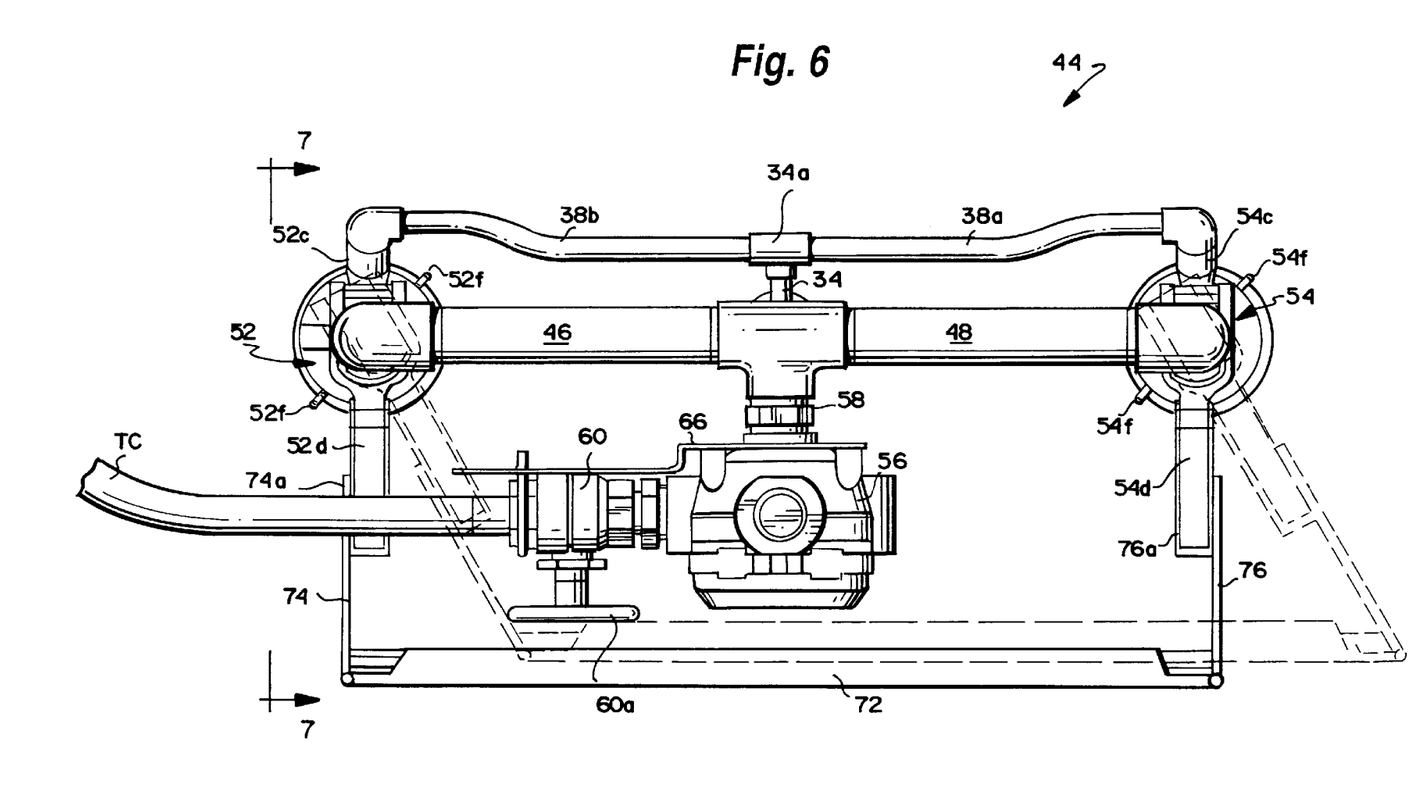
FIG. 6 is a top plan view of the manifold assembly depicted in FIG. 5 as taken along line 6—6 therein.
Figure 7:
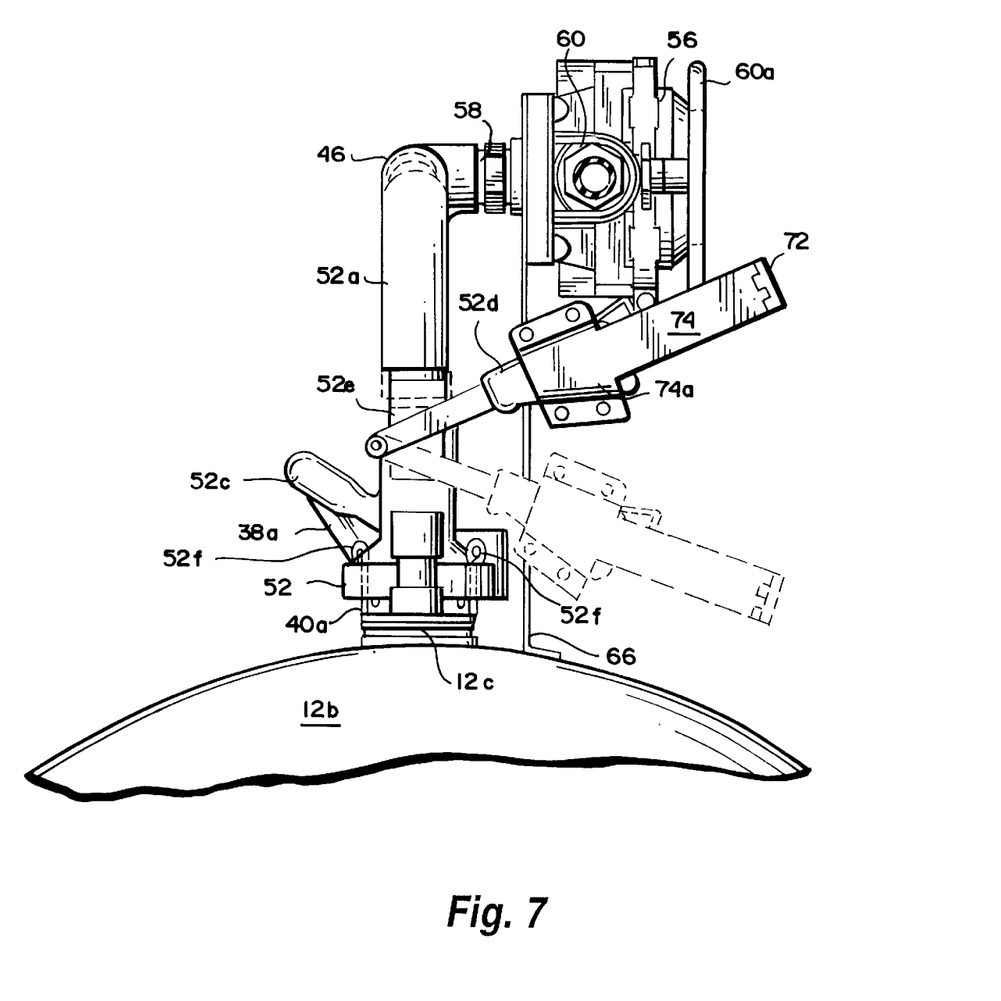
FIG. 7 is a side elevational view of the manifold assembly depicted in FIG. 6 as taken along line 7—7 therein.

The manifold assembly 44 according to this invention is housed within a security cover 45 which may be removably attached to the tank units 12, 14 via appropriate attachment brackets, an exemplary one of which is shown in FIG. 7 as reference numeral 45a. The manifold assembly 44 is itself shown in greater detail in FIGS. 5–7. In this regard, the manifold assembly 44 includes a pair of liquid supply conduits 46, 48 each having one end connected to a T-coupling 50 so as to be in opposed axial alignment with one another. The opposite end of each liquid supply conduit 46, 48 is fluid-connected to the discharge side of a respective on-off valving assembly 52, 54 via transition conduits 52a, 54a. The supply sides of the valving assemblies 52, 54 are in turn fluid-connected to liquid supply risers 52b, 54b each of which extends the entire vertical dimension within the tank units 12, 14, respectively, so as to ensure that the liquid contents therein may be accessed (see in this regard FIG. 2).

Figure 5:
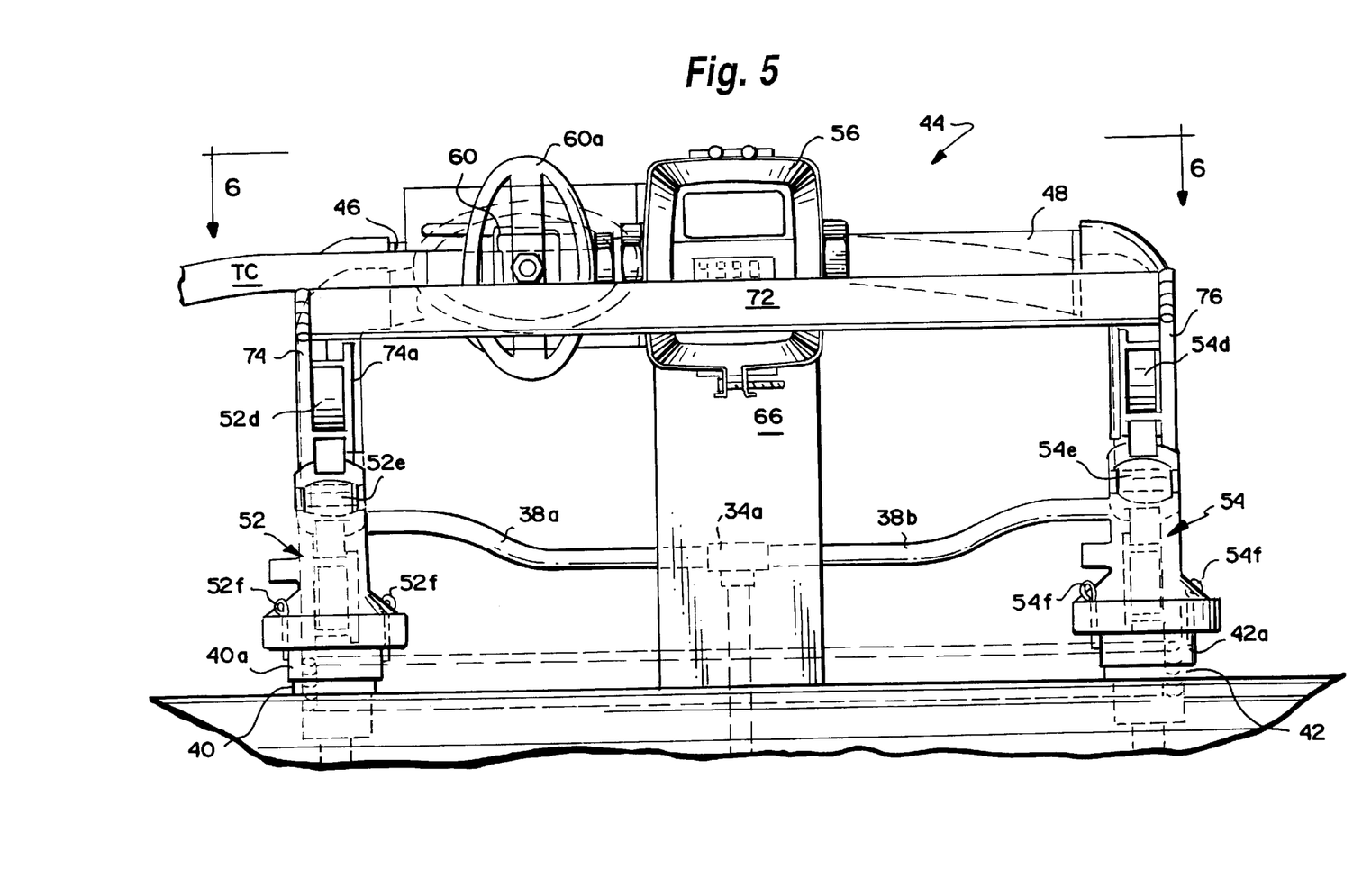
FIG. 5 is an enlarged front elevational view of the manifold assembly employed in the portable tank system of this invention.

It will be observed particularly in FIG. 5 that the liquid supply risers 52b, 54b are co-located with the tank access ports 40, 42 and extend concentrically through the fluid-tight valve assembly couplings 40a, 42a so as to establish an annular space therearound within the ports 40, 42, respectively. Thus, the pressurizing fluid from the branch supplies 38a, 38b is coupled to a pressurization inlet port 52c, 54c associated with each of the valving assemblies 52, 54 and thereby discharged into the annular spaces within the tank ports 40, 42. In such a manner, therefore, the liquid contents within each of the tank units 12, 14 will be maintained under constant equalized pressure.

The T-coupling 50 is fluid-connected to a flow meter 56 by a stub conduit 58. Since the respective liquids delivered to the T-coupling 50 by supply conduits 46, 48 are in opposed flow directions (i.e., due to the axially opposed alignment of the conduits 46 and 48), and under substantially equal pressure (i.e., due to the equalized pressure of the pressurizing fluid supplied to each tank unit 12, 14) the liquids within the T-coupling 50 will experience turbulent mixing conditions. The stub conduit 58 therefore provides a quieting chamber for the mixed liquids to ensure that the flow of such mixed liquids is accurately measured by the flow meter 56.

The mixed liquids are discharged from the flow meter 56 through manually actuated on-off control valve 60 and then on to the flexible transfer hose TC having a one-way flow coupling FC at its terminal end. Preferably, when not being used, the transfer hose 62 will be coiled around hose retainers 64 affixed to the exterior of end panel 12a (see FIGS. 1 and 3).

The flow meter 56 and on-off control valve 60 are mounted to the exterior of the sleeve 16 by mounting plate 66 so that the face plate 56a of the flow meter 56 and handle 60a of the control valve 60 protrude through respective openings formed in the front surface of the protective cover 45.

The valving assemblies 52, 54 are, in and of themselves, well known. Preferably, the valving assemblies 52, 54 are each a MacroValve MAV liquid transfer valve system commercially available from Micro Matic USA Inc. of Northridge, Calif. The preferred valving assemblies 52, 54 will therefor each be provided with a handle 52d, 54d which is pivotal vertically between an inactive position (in which the valving assembly is closed to disable fluid flow therethrough) and an active position (in which the valving assembly is opened to enable fluid flow therethrough). The handles 52d, 54d are each coupled to the valve bodies 52e, 54e via a mechanical linkage 52f, 54f. Thus, pivotal movement of the handles 52d, 54d from their respective inactive position (shown in solid line in FIGS. 5 and 7) to their respective active position (shown in dashed line in FIGS. 5 and 7) will in turn vertically displace each of the valve bodies 52e, 54e from a raised position and into a lowered position.

The liquid supply conduits 46, 48 are each formed of a material which is inert to the liquids contained within the tank units 12, 14 while also being capable of withstanding the pressure conditions during use. In addition, the material from which the liquid supply conduits 46, 48 are formed must be sufficiently flexible to allow for longitudinal bending thereof. The preferred material is PTFE. Thus, when the valving assemblies 52, 54 are operated so as to assume their respective active condition, the transition conduits 52a, 54a will be vertically displaced as a unit with the valve bodies 52e, 54e. Since the T-coupling 50 is positionally fixed (i.e., due to its rigid interconnection with the meter 56 via stub conduit 58), the liquid supply conduits 46, 48 will be caused to assume a slightly bowed condition along their respective longitudinal axes as shown in dashed line in FIG. 5. Thus, the flexibility of the liquid supply conduits 46, 48 will compensate for the relative movements that occur between the vertically displaceable transition conduits 52a, 54a and the positionally fixed T-coupling 50.

Important to the present invention, the manifold assembly 44 includes an actuator assembly 70 which interconnects the handles 52d, 54d of the spaced-apart valving assemblies 52, 54 so as to allow for substantial simultaneous operation thereof. The actuator assembly 70 is provided with an elongate activation handle 72 which is hinged at each of its opposed terminal ends to a distal end of a respective extension arm 74, 76. The proximal ends of the extension arms 74, 76, in turn, include sleeve couplings 74a, 76a which are rigidly sleeved over, and thus interconnect, the extension arms 74, 76 to the handles 52d, 54d associated with the valving assemblies 52, 54, respectively.

Thus, downward movement of the activation handle 72 will substantially simultaneously cause the handles 52d, 54d to move from their inactive position and into their active position. This operative movement, in turn, substantially simultaneously enables fluid flow through each of the valving assemblies 52, 54 and to the T-coupling 50 in the manner described above. As a result, the proper mixing ratio of the liquids contained within each of the tank units 12, 14 is virtually ensured since a user is essentially precluded from operating just one of the handles 52d, 54d which would cause one of the liquids to flow to the meter 56 prior to flow of the other liquid being initiated. In a similar manner, lifting of the activation handle 72 will cause the handles 52d, 54d of the valving assemblies 52, 54 to be returned pivotally to their inactive position thereby substantially simultaneously disabling fluid flow to the T-coupling 50.

The hinged connection between the terminal ends of the activation handle 72 and the extension arms 74, 76 enable the valve assemblies 52, 54 to be rotated (e.g., through about 60°) about their vertical axes relative to the valve couplings 40a, 40b so as to move from their coupled condition (as shown in solid line in FIG. 6) to an uncoupled condition (as shown in dashed line in FIG. 6). In such a manner, therefore, the valve assemblies 52, 54 may be uncoupled from the valve couplings without removal of the actuator assembly 70 to permit refilling of the tank units 12, 14 with respective liquids.

In use, the flow coupling FC will first be coupled operatively to a suitable storage tank in the field (for example, a storage tank associated with crop spraying equipment). The liquid contained within the tank units 12, 14 are pressurized by opening the supply valve 32a associated with the pressurization cylinder 32 (see FIG. 2). At this time, the meter 56 may then be reset and calibrated as needed for the liquid products contained within the tank units 12, 14. The handle 60a of the on-off control valve 60 will then be turned manually from its "off" position (as shown in solid line in FIG. 5) to its "on" position (as shown in dashed line in FIG. 5). Thereafter, downward manual movement of the activation handle 72 will enable each of the liquids within the tank units 12, 14 to flow to the T-coupling 50 where they are turbulently mixed prior to being discharged to the meter 56 and then on through the transfer conduit TC. After the proper quantity of mixed liquid has been transferred from the tank system 10 (as determined by the displayed reading on the meter 56), the activation handle 72 may be lifted thereby moving each of the valving assemblies 52, 54 to their inactive positions to disable fluid flow therethrough.

As noted above, the manifold assembly 44 is housed within a security cover 45 which is preferably only accessible by the liquid chemical refiller. In such a manner, therefore, the user in the field is prevented from modifying the manifold assembly 44 and/or from accessing the contents of the tank units 12, 14 which could have the adverse effect of changing the preset mixing ratio of the dissimilar liquid dispensed through the transfer conduit TC (thereby possibly resulting in crop injury). The security cover 45 is provided with openings to allow the handle 60a of the on-off valve 60 and the front face of the flow meter to protrude therethrough and be accessible to the user. Furthermore, the security cover is provided with channel openings 45a, 45b so as to allow movement of the extension arms 74, 76 of the actuator assembly 70 in the manner described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A portable holding and mixing tank system for at least two dissimilar liquids comprising:

at least two fluid-isolated holding compartments for holding a respective one of said dissimilar liquids;

a source of pressurizing fluid which is fluid-connected to each of said at least two fluid-isolated holding compartments for pressurizing said dissimilar liquids contained therein; and a manifold assembly fluid-connected to said at least two fluid-isolated holding compartments for receiving and mixing said at least two dissimilar liquids and discharging a mixed liquid thereof, wherein said manifold assembly includes, (a) at least two valving assemblies fluid-connected to respective ones of said at least two fluid-isolated holding compartments, each of said valving assemblies having inactive and active positions for respectively disabling and enabling flow of said dissimilar liquids from said holding compartments; and (b) an actuator assembly operatively coupled to said at least two valving assemblies for substantially simultaneously moving said valving assemblies between said inactive and active positions and thereby substantially simultaneously disable and enable flow of said dissimilar liquids therethrough, respectively, wherein (c) said actuator assembly includes an elongate activation handle, and a pair of extension arms each of which hingedly interconnects a respective end of said activation handle to a respective one of said valve assemblies.

2. The tank system as in claim 1, wherein each of said valve assemblies includes a valve handle, and wherein each said extension arm is coupled to a respective said valve handle.

3. The tank system as in claim 2, wherein said extension arms include sleeve couplings which are sleeved over and coupled to said respective valve handle.

4. The tank system as in claim 1, wherein said at least two fluid-isolated holding compartments are provided by a pair of tank units located in side-by-side relationship so as to establish a space therebetween.

5. The system of claim 4, wherein said manifold assembly includes a pressurizing supply conduit positioned within said established space between said pair of tank units and having one end fluid-connected to said source of pressurizing fluid, and a pair of branch supply conduits fluid-connecting said one end of said supply conduit to a respective one of said holding compartments.

6. A system as in claim 4, further comprising a cylindrical sleeve member defining circumferential edges which are rigidly joined to respective ones of said pair of tank units so as to circumferentially bound said space established therebetween.

7. A portable holding and mixing tank system for at least two dissimilar liquids comprising:
   at least two fluid-isolated holding compartments for holding a respective one of said dissimilar liquids;
   a source of pressurizing fluid which is fluid-connected to each of said at least two fluid-isolated holding compartments for pressurizing said dissimilar liquids contained therein; and
   a manifold assembly fluid-connected to said at least two fluid-isolated holding compartments for receiving and mixing said at least two dissimilar liquids and discharging a mixed liquid thereof, wherein said manifold assembly includes,
   (a) at least two valving assemblies fluid-connected to respective ones of said at least two fluid-isolated holding compartments, each of said valving assemblies having inactive and active positions for respectively disabling and enabling flow of said dissimilar liquids from said holding compartments; and
   (b) an actuator assembly operatively coupled to said at least two valving assemblies for substantially simultaneously moving said valving assemblies between said inactive and active positions and thereby substantially simultaneously disable and enable flow of said dissimilar liquids therethrough, respectively, wherein
   said valve assemblies each include a valve body which is vertically displaceable between raised and lowered positions in response to movement of said valve assemblies between said inactive and active positions, and wherein
   said manifold assembly includes a T-coupling, and liquid supply conduits each fluid-connecting a respective said valve body to said T-coupling,
   said liquid supply conduits being sufficiently flexible so as to be axially bendable in response to vertical displacements of each said valve body between said raised and lowered positions thereof.

8. A tank system for dissimilar liquids comprising:
   a pair of tank units for holding a respective one of said dissimilar liquids;
   a source of pressurizing fluid which is fluid-connected to each of said tank units for pressurizing the respective one of said dissimilar liquids held thereby;
   a manifold assembly fluid-connected to each of said tank units for withdrawing said dissimilar liquids from said tank units;
   a pair of spatially separated valve assemblies each fluid-connecting a respective one of said tank units to said manifold assembly and having inactive and active positions for respectively disabling and enabling flow of said dissimilar liquids from said tank units to said manifold assembly; and
   an activation handle spanning said spatially separated valve assemblies for substantially simultaneously moving said valve assemblies between said inactive and active positions, wherein
   said valve assemblies each include a valve body which is vertically displaceable between raised and lowered positions in response to movement of said valve assemblies between said inactive and active positions, and wherein
   said manifold assembly includes a T-coupling, and liquid supply conduits each fluid-connecting a respective said valve body to said T-coupling,
   said liquid supply conduits being sufficiently flexible so as to be axially bendable in response to vertical displacements of each said valve body between said raised and lowered positions thereof.

9. The tank system as in claim 8, wherein said at least two fluid-isolated holding compartments are provided by a pair of tank units located in side-by-side relationship so as to establish a space therebetween.

10. The system of claim 9, wherein said manifold assembly includes a pressurizing supply conduit positioned within said established space between said pair of tank units and having one end fluid-connected to said source of pressurizing fluid, and a pair of branch supply conduits fluid-connecting said one end of said supply conduit to a respective one of said holding compartments.

11. A system as in claim 9, further comprising a cylindrical sleeve member defining circumferential edges which are rigidly joined to respective ones of said pair of tank units so as to circumferentially bound said space established therebetween.

12. A tank system for dissimilar liquids comprising:
   a pair of tank units for holding a respective one of said dissimilar liquids;
   a source of pressurizing fluid which is fluid-connected to each of said tank units for pressurizing the respective one of said dissimilar liquids held thereby;
   a manifold assembly fluid-connected to each of said tank units for withdrawing said dissimilar liquids from said tank units;
   a pair of spatially separated valve assemblies each fluid-connecting a respective one of said tank units to said manifold assembly and having inactive and active positions for respectively disabling and enabling flow of said dissimilar liquids from said tank units to said manifold assembly; and
   an activation handle spanning said spatially separated valve assemblies for substantially simultaneously moving said valve assemblies between said inactive and active positions, wherein
   said activation handle includes a pair of extension arms each of which hingedly interconnects a respective end of said activation handle to a respective one of said valve assemblies.

13. The tank system as in claim 12, wherein each of said valve assemblies includes a valve handle, and wherein each said extension arm is coupled to a respective said valve handle.

14. The tank system as in claim 13, wherein said extension arms include sleeve couplings which are sleeved over and coupled to said respective valve handle.

* * * * *